(12) United States Patent
Allen et al.

(10) Patent No.: US 8,352,178 B2
(45) Date of Patent: Jan. 8, 2013

(54) METHOD AND DEVICE FOR GENERATING AND COMMUNICATING GEOGRAPHIC ROUTE INFORMATION BETWEEN WIRELESS COMMUNICATION DEVICES

(75) Inventors: Andrew Michael Allen, Mundelein, IL (US); Daniel Edward Kaldor, Tokyo (JP)

(73) Assignee: Research In Motion Limited, Waterloo (CA)

( * ) Notice: Subject to any disclaimer, the term of this patent is extended or adjusted under 35 U.S.C. 154(b) by 642 days.

(21) Appl. No.: 12/546,999

(22) Filed: Aug. 25, 2009

(65) Prior Publication Data
US 2011/0054770 A1 Mar. 3, 2011

(51) Int. Cl.
G01C 21/31 (2006.01)
G01C 21/30 (2006.01)
(52) U.S. Cl. ...... 701/410; 701/420; 340/988; 455/414.1
(58) Field of Classification Search .................. 701/400, 701/408–410, 420, 422, 428, 431, 484, 517, 701/522, 526, 527, 533, 537, 541; 340/988; 455/414.1, 456.3, 456.6, 457
See application file for complete search history.

(56) References Cited

U.S. PATENT DOCUMENTS

| | | | |
|---|---|---|---|
| 5,848,373 A | 12/1998 | DeLorme | |
| 5,952,959 A | 9/1999 | Norris | |
| 5,959,577 A | 9/1999 | Fan | |
| 6,092,076 A | 7/2000 | McDonough et al. | |
| 6,202,026 B1 | 3/2001 | Nimura | |
| 6,321,158 B1 | 11/2001 | DeLorme | |
| 6,429,812 B1 * | 8/2002 | Hoffberg | 342/357.31 |
| 6,577,949 B1 | 6/2003 | Robinson et al. | |
| 6,633,809 B1 | 10/2003 | Aizono | |
| 6,868,333 B2 | 3/2005 | Melen | |
| 7,421,275 B1 | 9/2008 | Hancock | |
| 7,474,960 B1 | 1/2009 | Nesbitt | |

(Continued)

FOREIGN PATENT DOCUMENTS

EP 1677077 7/2006

(Continued)

OTHER PUBLICATIONS

"Save and share directions with My Maps," Google Lat Long Blog, Apr. 23, 2009, http://google-latlong.blogspot com/2009/04/save-and-share-directions-with-my-maps.html.

(Continued)

Primary Examiner — Paul N Dickson
Assistant Examiner — George Spisich
(74) Attorney, Agent, or Firm — Novak Druce + Quigg LLP

(57) ABSTRACT

Provided is a method, wireless communication device and computer program product for generation and communication of a geographic route from a first device to a second device. The method involves presenting a reference map using the first device; receiving route input using the first device, said route input indicative of the geographic route relative to the reference map; processing said route input with respect to a reference coordinate system to generate processed route information indicative of the geographic route; and communicating said processed route information to the second device. The method may further involve receiving and processing processed route information, using the second device, the processing performed at least in part based on the reference coordinate system and an output reference map to generate route output indicative of the geographic route relative to the output reference map; and presenting said route output using the second device.

18 Claims, 10 Drawing Sheets

U.S. PATENT DOCUMENTS

| | | | |
|---|---|---|---|
| 7,487,114 B2* | 2/2009 | Florance et al. | 705/27.2 |
| 2004/0233070 A1* | 11/2004 | Finnern | 340/995.13 |
| 2005/0222756 A1* | 10/2005 | Davis et al. | 701/205 |
| 2006/0080432 A1 | 4/2006 | Spataro | |
| 2007/0168118 A1* | 7/2007 | Lappe et al. | 701/207 |
| 2007/0225902 A1* | 9/2007 | Gretton et al. | 701/202 |
| 2007/0233379 A1* | 10/2007 | Bowman et al. | 701/211 |
| 2007/0252689 A1* | 11/2007 | Rothschild | 340/539.13 |
| 2008/0045243 A1 | 2/2008 | Billmaier | |
| 2008/0114543 A1* | 5/2008 | Vishnu | 701/209 |
| 2008/0125967 A1* | 5/2008 | Sprigg | 701/209 |
| 2008/0133599 A1* | 6/2008 | Stewart et al. | 707/104.1 |
| 2009/0005018 A1 | 1/2009 | Forstall | |
| 2009/0125228 A1* | 5/2009 | Dicke et al. | 701/201 |

FOREIGN PATENT DOCUMENTS

| | | |
|---|---|---|
| EP | 1843538 | 10/2007 |
| WO | 0148440 | 7/2001 |
| WO | 02060157 | 8/2002 |
| WO | 2008076507 | 6/2008 |
| WO | 2008150968 | 12/2008 |
| WO | 2009011838 | 1/2009 |

OTHER PUBLICATIONS

"Google Maps Introduction" (video) http://www.youtube.com/watch?v=ADbeCHQLUpk&eurl=http://maps.google.ca/support/bin/topic.py?topic=10780&hl=en Time: 2:10-2:39.

TakItWithMe—GoogleTM My Maps Converter Beta (webpage), 2007, http://www.takitwithme.com.

"SLATE—Shared Lightweight Annotation Technology," Pacific Science & Engineering Group, Date unknown, document no longer available at http://www.pacific-science.com/AppliedCognition/SLATEbriefing.pdf.

"DMA Technical Manual: Datums, Ellipsoids, Grids and Grid Reference Systems," DMA TM 8358.1, Edition 1, Defense Mapping Agency, Sep. 1990.

* cited by examiner

METHOD AND DEVICE FOR GENERATING AND COMMUNICATING GEOGRAPHIC ROUTE INFORMATION BETWEEN WIRELESS COMMUNICATION DEVICES

CROSS-REFERENCE TO RELATED APPLICATIONS

This is the first application filed for the present technology.

TECHNICAL FIELD

The present disclosure relates generally to wireless communication devices and, in particular, to techniques for generating and communicating geographic route information and related information between devices.

BACKGROUND

Mobile wireless communication devices such as cellular telephones, handheld PDAs, and the like, are now capable of supporting features beyond voice or text-based communication between users, such as multimedia features. Due to their portability and communication capabilities, mobile wireless communication devices are particularly suited to applications facilitating navigation. For example, graphical user interfaces may be used to display maps, and location technology such as cellular triangulation, GPS, and the like, may be used to display a user's location on the map. Location technology may further be used to facilitate location-based services such as turn-by-turn navigation.

Typically, navigation applications available to wireless communication devices allow users to view their own location, and in some instances to view the location of a desired destination. For example, a destination location or location of a friend may be displayed on a map as the result of a database query by the user for a specific destination or type of destination. In some instances, automated algorithms may be used to generate a route from the user's location to a desired destination. However, such algorithms may be of limited usefulness if they are prone to error or fail to fully account for a user's navigational requirements or context.

BRIEF DESCRIPTION OF THE DRAWINGS

Further features and advantages of the present technology will become apparent from the following detailed description, taken in combination with the appended drawings, in which.

It will be noted that throughout the appended drawings, where conveniently practicable, like features are identified by like reference numerals.

DETAILED DESCRIPTION

The present technology generally provides a method, wireless communication device and computer program product for generation and communication of geographic route, route-related information, or both, between wireless communication devices.

Accordingly, an aspect of the present technology is a method comprising: presenting a reference map; receiving route input indicative of the geographic route relative to the reference map; processing said route input to generate processed route information indicative of the geographic route with respect to a reference coordinate system; and forming a message for delivery via a wireless communication network to a recipient, said message containing at least a portion of said processed route information.

In some embodiments, a method in accordance with the present technology may further comprise: receiving the processed route information; processing said processed route information to generate route output indicative of the geographic route relative to an output reference map; and presenting said route output.

Another aspect of the present technology is a computer program product configured to generate and communicate a geographic route between wireless communication devices, the computer program product comprising code adapted to perform acts associated with the foregoing methods when the code is loaded into a memory and executed on one or more associated processors of one or more wireless communication devices.

Yet another aspect of the present technology is a wireless communication device configured to generate and communicate geographic route. The wireless communication device comprises: an output user interface configured to present a reference map; an input user interface configured to receive route input indicative of a geographic route relative to the reference map; a processing module configured to process said route input to generate processed route information indicative of the geographic route with respect to a reference coordinate system; and a radiofrequency transceiver configured to transmit said processed route information.

In some embodiments, the wireless communication device in accordance with the present technology may be further configured as follows: the radiofrequency transceiver is further configured to wirelessly receive another processed route information from another device, said other processed route information indicative of another geographic route with respect to a defined reference coordinate system; the processing module further configured to process said other processed route information to generate route output indicative of the second geographic route relative to an output reference map; and the output user interface is further configured to present said route output.

The details and particulars of these aspects of the technology will now be described below, by way of example, with reference to the attached drawings.

Figure 1A:
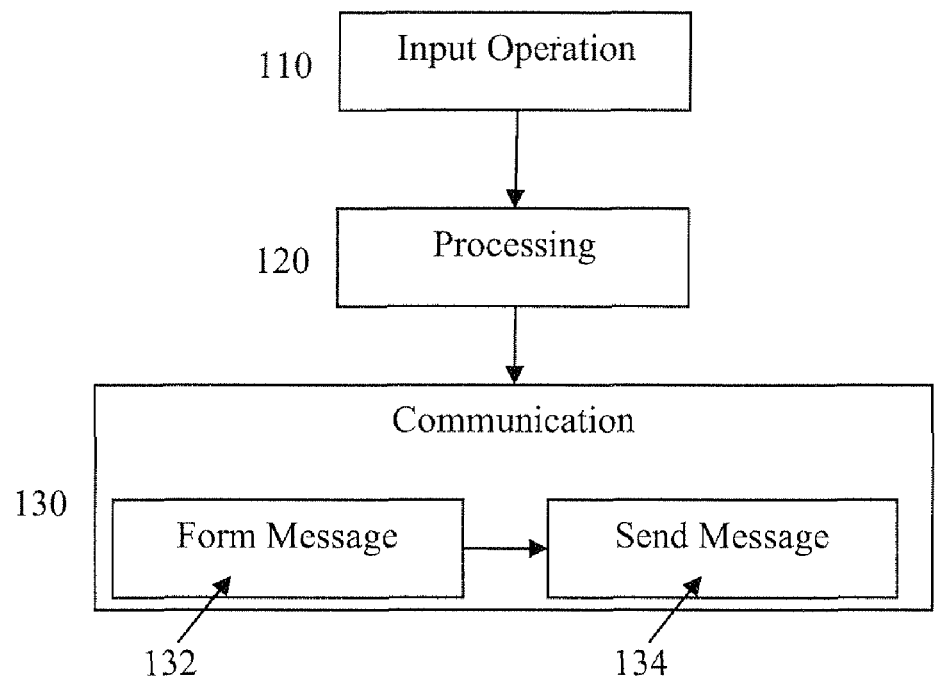
FIG. 1A illustrates acts performed in association with embodiments of the present technology.

FIG. 1A illustrates a method for generating and communicating a geographic route from a wireless communication device, also referred to herein as a transmitting device. The method generally comprises receiving, from a user, via a network, via another wireless communication device, or a combination thereof, route input indicative of the geographic route via an input operation 110, processing the route input via a processing operation 120, and transmitting the processed route input as processed route information via a communication operation 130. The input operation 110 may further comprise providing route-related information such as photos, pictures, voice recordings, or the like, associated with a geographic route.

Figure 1B:
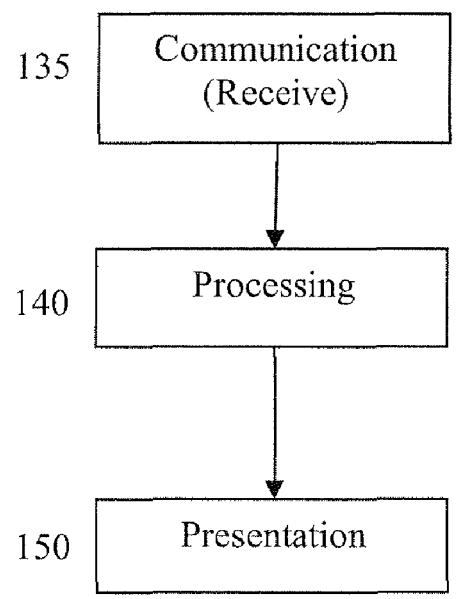
FIG. 1B illustrates acts performed in association with embodiments of the present technology.

FIG. 1B illustrates a method for receiving and processing processed route information, indicative of a geographic route, by a wireless communication device, also referred to herein as a receiving device. The method generally comprises receiving the processed route information via a communication operation 135, processing the communicated information via a processing operation 140, and presenting the processed information via a presentation operation 150. The above-mentioned operations 110 to 150 are described in more detail herein with respect to embodiments of the present technology.

In embodiments of the technology, the methods according to FIGS. 1A and 1B may be performed sequentially and interdependently. For example, the geographic route may be generated and communicated as illustrated in FIG. 1A and then received and processed as illustrated in FIG. 1B. As another example, input for input operation 110 of FIG. 1A may be based on a combination of input via an input user interface and previously received information such as generated by one or more of steps 135, 140 and 150 illustrated in FIG. 1B. That is, processed route information received by a wireless device may be modified or augmented to provide new route input. Modification or augmentation of received processed route information may comprise changing route details, adding pictures or voice commentary, or the like.

Sequential modifications or augmentations of route information may be made by one or more communicatively coupled wireless communication devices, for example to collaboratively develop processed route information using plural devices. In some cases, some modifications or augmentations to encoded route information may be made concurrently. For example, plural wireless communication devices may concurrently obtain and edit the same version of encoded route information. In this case, the concurrent modifications may be subsequently merged to provide an updated and commonly held processed route information for plural devices.

In some embodiments, route-related information, such as text or voice notes, map scribbles, pictures or videos, multimedia, or the like, may be associated with the processed route information. Route-related information may be communicated between wireless communication devices, for example interactively or in real time. Route-related information may be provided during initial generation of encoded route information, via sequential modifications at one or more wireless communication devices, or both, for example.

In embodiments of the technology, a wireless communication device may be both a transmitting device and receiving device. Transmitting devices and receiving devices may alternatively or additionally be separate, communicatively coupled wireless communication devices.

Generation of Route Input

In some embodiments, the route input operation 110 illustrated in FIG. 1A includes: presenting a reference map via an output user interface, and receiving route input indicative of the geographic route via an input user interface. For example, the reference map may be presented via a visual display such as a LCD display screen operatively coupled to a wireless communication device. The reference map may provide a visual reference or context for facilitating input of the geographic route via the input user interface.

In some embodiments, a user may provide route input via an input user interface, for example using a touch-screen, trackball, stylus pen, cursor keys, voice commands, or other method or device that enables the user to indicate either one or more points on the route or otherwise indicate the route. The geographic route may thus be user-defined, relative to the reference map. The route input may be indicative of start and end locations, as well as a discrete or continuous locus of intermediate points indicative of a recommended path between start and end locations. The start location and/or end location and/or intermediate location could, in some embodiments, be automatically obtained based on the user's current location, i.e. the transmitting device, or the current location of the other user, i.e. the receiving device, based on auto location information, for example GPS, cell tower triangulation, radiolocation techniques or other positioning systems, or based on civic location information, for example an address, entered using a keyboard. The location of the receiving device for use as the start location or end location or an intermediate location may be wirelessly received by the transmitting device when communicated from the receiving device, and subsequently used as initial input to the route mapping operation. Visual feedback may be used to facilitate accurate input of the geographic route relative to the reference map. For example the route input may be displayed in real time as it is received, overlaid on the reference map.

In some embodiments, route input may be partially or fully generated by prior local or remote user input. For example, route input may be received by loading a predetermined route from local or remote memory. A user may record and store route input in local or remote memory and later recall some or all of the stored route input from memory to provide route input in accordance with the present technology.

In some embodiments, route input may be provided at least in part by using a GPS or other positioning device to record a geographic route being traversed by the user. The geographic route recorded and provided as route input by the positioning device may be stored and retrieved as route input, or provided as route input as it is generated.

In some embodiments, route input may be based at least in part on processed route information received from another wireless communication device. For example, a wireless communication device may receive and process processed route information from another wireless communication device to generate route output. The route output may then be presented and regarded as route input. The route output may be revised, edited, augmented, or the like, and used as route input in subsequent operations as described herein.

In some embodiments, plural wireless communication devices may collaboratively generate information indicative of a geographic route by sequential communication and editing. For example, a first wireless communication device may generate processed route information indicative of a geographic route, which is communicated to a second wireless communication device. The second wireless communication device may process and edit the processed route information, as described herein, and communicate the edited information back to the first wireless communication device, or to a third wireless communication device. Multiple rounds of communication and editing may be performed in this manner.

In some embodiments, the present technology facilitates providing common map reference information between plural wireless communication devices. For example, processed route information, communicated so as to be commonly held by plural wireless communication devices, may include common map reference information comprising an indication of map center or corner geographic location, map zoom, and map rotation, and optionally an indication of one or more map layers to be displayed.

The common map reference information may facilitate improved collaboration between wireless communication devices with regard to generating, editing, or augmenting processed route information. For example, each device may receive and edit a previous version of the processed route information to provide new processed route information indicative of a revised geographic route. Devices may update or append route-related information to the processed route information, such as pictures, scribbles, text or voice commentary. Interaction between plural wireless communication devices may enable real-time capture and relay of information related to the geographic route, such as drawings, scribbles, picture, text or voice attachments, or the like. In some embodiments, common map reference information may facilitate collaboration by ensuring each wireless device is working with a comparable geographic representation.

In some embodiments, the route input indicative of the geographic route may be represented at the input user interface in a predetermined format. For example, input from a resistive touch screen may be represented as a series of digital data representative of sampled electrical currents or voltages, which may be varied by changing electrical resistance or related characteristics of conductors embedded in the screen via touch. Other touch screen types include acoustic, capacitive, mechanical, optical, or the like. Input from a mouse or trackball may be represented as sampled data from an absolute or relative rotary encoder. Input from other input user interfaces such as cursors, keypads, motion capture devices, input sensors, or the like may similarly provide digital or analog input data in an appropriate predetermined format, as would be readily understood by a worker skilled in the art. This route input may be processed in context by the wireless communication device, for example to draw a line or curve on a screen representative of the geographic route or portion thereof.

Configuration of Map Representations

In embodiments of the present technology, reference maps, as well as output reference maps or other maps, presented via a visual display may be configured or adjusted in various ways, for example automatically, interactively, or both. For example, a displayed representation of a reference map may be adjusted by panning, zooming or adjusting map scale, rotation of the map and associated compass directions with respect to the screen, tilting the map between plan view and street view, or the like.

In some embodiments, the displayed portion of a map may be adjusted so that a region of interest is displayed at a desired level of detail, and possibly within a desired context of neighbouring geographic regions. Panning may be performed to adjust the base coordinates of the displayed map, for example adjusting the geographic location represented by a predetermined point of the display, such as the center or bottom left corner.

Other contemplated map adjustments include adjustments to levels or types of detail, switching on and off display layers, legends, and the like. Map layers indicative of features such as streets, paths, terrain, points of interest, weather data, obstacles, contour lines, advertisements, and the like may be adjusted or turned on or off. Map style, colour, projection type, level of detail, shading, three-dimensional representations, or the like, may also be adjusted.

In some embodiments, an input or output reference map may be configured or adjusted remotely. For example, processed route information received by a receiving device may comprise instructions for configuring or modifying a representation of an output reference map displayed thereby. Such processed route information may include information indicative of parameters for representation of the output reference map, said information encoded for example in a vector, list, or plurality of data fields in a suitable message format for delivery over a network, such as XML or KML. Portions of the information may be interpreted and used for setting output reference map display parameters at the receiving device, such as center coordinates, zoom or scale factor, map rotation or tilt angle, or the like.

In some embodiments, the map may be a graphical representation of the geographical area containing graphics representing roads, paths, cycle ways, buildings, and the like. In other embodiments, the map may be a satellite photographic image of the area.

In some embodiments, instructions for remotely configuring or modifying a representation of a reference map may be used for initial or interactive configuration of the output reference map of a receiving device by a transmitting device providing the processed route information. For example, the transmitting device may periodically send map configuration instructions, thereby allowing the transmitting device to influence the representation of the output reference map displayed by the receiving device. In some embodiments, the output reference map representation displayed by the receiving device can be made to mimic the reference map representation displayed by the transmitting device. Such configuration may occur in response to initial transmission of the processed route information, periodically, or in real time. In some embodiments, the receiving device may similarly, and for analogous purposes, transmit instructions to the transmitting device for configuring or modifying the representation of the reference map.

In some embodiments, instructions contained within the processed route information may be used for interpretation of other processed route information. For example, the instructions may facilitate presentation or selection of an appropriate reference map at a receiving device. In some embodiments, said instructions of the processed route information may comprise an indication of a desired reference map or representation thereof. This may facilitate displaying the same reference map or representation thereof on both transmitting and receiving devices, for example.

In some embodiments, when a reference map is shown along with a representation of the geographic route, the route representation may be adjusted along with adjustments to the map representation, so as to maintain accuracy of the geographic route representation relative to the reference map. For example, the route may be subject to operations such as panning, map zooming or scaling, map rotation or tilting, or the like. Adjustments to the geographic route and reference map may be made separately, or the geographic route and reference map may be merged into a single representation and adjusted together.

Reference Coordinate Systems

In some embodiments, one or more reference coordinate systems may be associated with one or more of: the route input data; and maps such as input or output reference maps. Each reference coordinate system is representative of geographic locations in a predetermined region, for example locations near or along the geographic route. The reference coordinate system may be proprietary or non-proprietary, and may be defined globally or over a limited geographic region. In some embodiments, different reference coordinate systems may be associated with different route data or maps. In some embodiments, a common reference coordinate system may be associated with at least two objects from the group comprising route input data, reference maps, output reference maps, and the like.

For example, latitude and longitude coordinates, are widely used as a global reference coordinate system. Latitudes and longitudes may be expressed in degrees, minutes, and seconds, or in degrees in decimal format. The World Geodetic System such as WGS 84 is an example of a reference coordinate system utilizing a latitude and longitude reference coordinate system based on a spheroidal model of the Earth.

In some embodiments, civic location information such as an address may be used to indicate coordinates. For example, a civic location can be a described location based on a reference system, such as a jurisdictional region or postal delivery grid.

In one embodiment, the reference coordinate system is specific to a reference map representation. For example, the representation of the reference map may include a two-dimensional representation of a geographic area, bounded by left, right, top and bottom edges. The associated reference coordinate system may specify a location relative to the reference map for example by specifying the location's distance from left and bottom edges, respectively, relative to total distance from left edge to right edge and bottom edge to top edge, respectively. As another example, a location may be specified by specifying the distance from a point such as the bottom left corner, along with an angle from a reference direction, such as that of the reference map bottom edge. A line, curve or route may be represented as a series of locations or control points specified in the reference coordinate system.

Other examples of reference coordinate systems include the Universal Transverse Mercator (UTM) coordinate system, the Universal Polar Stereographic (UPS) coordinate system, and the Military Grid Reference System (MGRS), as would be readily understood by a worker skilled in the art. Other proprietary or non-proprietary reference coordinate systems may be used to specify geographic locations, cities, or regions, for example based on predetermined representations of a geographic region, such as obtained via a map projection, such as a Mercator, Albers, stereographic or like projection. A reference coordinate system may further comprise a two-dimensional orthogonal or non-orthogonal grid, polar, spherical, elliptical coordinate system or other coordinate system for referencing locations in a predetermined region.

Data Processing

Various acts related to processing of data such as route input, processed route information, or data derived therefrom are described herein. Processing may comprise computational operations or transformations such as data formatting for display, conversion of information between formats, conversion of information between coordinate systems or location systems data compression, and the like. Various processing acts may be performed at the transmitting device or receiving device, as appropriate. For example, processing of route input data is typically performed at the transmitting device, while processing of processed route information may be performed at the transmitting or receiving device.

In some embodiments, processing may comprise converting route input data or processed route information into instructions for displaying lines, curves, or a combination thereof, indicative of the geographic route on a visual display. The geographic route may then be represented via an overlay on a reference map, for example. At the transmitting device, this may facilitate providing route input which is accurately representative of the geographic route. The display instructions may comprise pixel-by-pixel display instructions, or instructions to read and display data in a file or memory location. Display instructions and operations, associated file formats, and the like may be performed via proprietary or non-proprietary protocols as would be readily understood by a worker skilled in the art, such as an XML file.

In some embodiments, route input data or processed route information may be encoded in a standard or proprietary format, such as a raster or vector format adapted for displaying the geographic route on a visual display. The format may be user defined or determined automatically, for example to provide an appropriate representation of a geographic route based on predetermined requirements.

In some embodiments, data encoded in a raster format may be generally characterized as a two-dimensional grid of pixels, each containing instructions for defining a particular color to be displayed on screen at that pixel location, or possibly for being "transparent" to another layer at one or more pixel locations. A display may be used to display multiple overlapping or non-overlapping items, as would be readily understood by a worker skilled in the art, for example by aggregating display requirements from different sources to provide final screen output data.

In some embodiments, data encoded in a vector format may comprise specifications of one or more lines, polylines, Bezier curves, circular or elliptical arcs, or combinations thereof, defined in a manner relative to boundaries of a graphics display area, or alternatively relative to boundaries of a reference map area, for example as defined by a window within the visual display.

In some embodiments, data in raster, vector, or other formats may be further encoded or compressed in various ways as would be readily understood by a worker skilled in the art. Use of a vector format may facilitate representation of the geographic route with substantial accuracy at a variety of scales.

In some embodiments, one or more image files or other image representation or delivery formats, for example a representation in JPEG, GIF, TIF, bitmap or other image format, containing a map image and in some embodiments also the traced route may be communicated between the wireless communication devices. In some embodiments the map may be sent as an image and the route may be communicated using other embodiments for communicating routes relative to the map image, as are defined herein. In some embodiments the route may also be communicated separately as an route image and then overlaid or merged with the map image to produce a merged map and route image. Such a merge may for example entail replacing the background color of the route image, for example blue, with the map image leaving the route, for example a red line, superimposed over the map image. By not sending a complete image containing both the map image and the route image as a single image when the route image is updated, higher compression ratios using for example JPEG compression, can be achieved reducing the amount of data to be transmitted. Moreover, sending the route input data or processed route information by message addressed to a recipient, such as another wireless communication device, provides privacy to the communication devices. Also, it will be understood that sending the processed route information independently of the map reference data allows reduced data transmission for updates sent between devices.

In some embodiments geographical location coordinates may also be provided and communicated and associated with the map image or route image. For example geographical location coordinates for each of the corners of the map image may be communicated which can allow the map image to be used with the location identification capabilities of the receiving device.

The processing operation 120 illustrated in FIG. 1A may comprise one or more processing operations applied to a route input indicative of the geographic route. Processing the route input comprises processing data to provide processed route information. In some embodiments, the processed route information may be indicative of the geographic route with respect to a reference coordinate system, such as a reference coordinate system associated with the displayed reference map or another reference coordinate system.

The processing operation 120 may comprise encoding the route input into a format which provides a representation of the geographic route with respect to a reference coordinate system. For example, route input data may be encoded as instructions for drawing a representation of the geographic route with respect to an implicitly or explicitly specified, predetermined or selected reference coordinate system.

The processed route information may be provided, for example via processing operation 120, in a particular format, such as a raster or vector format. For raster-formatted processed route information, plural points along the geographic route may be represented as plural points in a reference coordinate system. Spacing between points may be fixed or variable, and may further be determined based on a desired level of resolution for display or for interpolation between points. For vector-formatted processed route information, endpoints or control points associated with each line, polyline, curve, or the like, may be specified as points in the reference coordinate system, and these points may be used to along with data indicative of use or groupings of endpoints, to represent route information in a vector format within the reference coordinate system.

In some embodiments, the processing operation 120 comprises converting route input or processed route information between coordinate systems. Data indicative of a geographic route with respect to a first coordinate system may be converted to data indicative of the geographic route with respect to a second coordinate system. For example, the first coordinate system may be a coordinate system associated with a displayed reference map, whereas the second coordinate system may be a latitude and longitude, WGS 84, UTM, or other reference coordinate system. As another example, the first and second coordinate systems may be the same or different reference coordinate systems. This may facilitate communication and flexible interpretation or representation of the processed route information. For example, if a common reference coordinate system is known to both transmitting and receiving devices, a map or indication thereof need not be communicated in some embodiments of the present technology.

Embodiments of the present technology provide for processing operations configured to represent or convert route input data or processed route information with respect to various coordinate systems at the transmitting device, receiving device, or both. For example, such coordinate systems may include: input user interface coordinate systems, output user interface coordinate systems, and one or more reference coordinate systems.

In some embodiments, a series of conversion operations may be performed. For example, route input data may be initially encoded with respect to a first coordinate system, and the resultant processed route information may be converted so as to be encoded with respect to a second coordinate system. Processed route information may be converted to a desired coordinate system at either or both of a transmitting and receiving device.

In some embodiments, plural encoding or conversion operations may be performed in a compound or combined processing operation. In a compound operation, data encoded with respect to a first coordinate system may be converted to data encoded with respect to a second coordinate system, the conversion dependent on one or more intermediate coordinate systems as well as the first and second coordinate systems. Conversions may be performed via look-up tables, linear or nonlinear mathematical subroutines, or the like.

In some embodiments, external coordinate conversion capabilities or services, for example provided as related but substantially independent software on a wireless communication device, may be utilized in processing and conversion operations.

In some embodiments, processing or conversion of processed route information between reference coordinate systems may be generally represented by a mathematical equation such as $(z,w)=f(x,y)$. Such a representation may be interpreted, for example to mean that each point $(x,y)$ on a route in a first coordinate system becomes a point $(z,w)$ in a second coordinate system, wherein the correspondence between points is represented by the function f. The correspondence may be one-to-one, one-to-many, or many-to-one.

In some embodiments, plural conversions may be represented by a composition of functions. For example, if function f maps a first coordinate system to a second coordinate system, and function g maps the second coordinate system to a third coordinate system, then function $h=f(g)$ may map the first coordinate system to the third coordinate system. In some embodiments, inverse functions may also be used to reverse-map between coordinate systems.

A worker skilled in the art would understand how to convert processed route information between reference coordinate systems such as those identified herein. For example, conversion between some reference coordinate systems may be accomplished by a linear transformation function such as $z=Ax+b$, where A is a constant matrix, b is a constant vector, and x and z are vectors representative of the same geographic point in a first and second reference coordinate system, respectively. Such a linear transformation may reflect a translation or offset between coordinate systems (by variation of b), or differences in scaling in one or more reference directions, differences in rotation or orientation, reversal of reference directions, shearing, or a combination thereof.

In some embodiments, reference coordinate systems may differ with respect to the underlying data or assumptions used for their construction, for example geodetic datum or surveyed reference points between which map locations are interpolated, the model used to represent the Earth, or a combination thereof. For example, North American Datum of 1927 (NAD 27) and North American Datum of 1983 (NAD 83) are two geodetic reference systems based on different geographic measurements. Conversion of latitude and longitude coordinates between these two reference systems is specified in the United States Federal Standard "NADCON," as specified in the Federal Register, Volume 55, Number 155 dated Aug. 10, 1990. Lines of latitude and longitude are typically matched to specific landmark or reference points, which are typically specified for a given map.

In some embodiments, the processing operation 120 comprises converting route input data or processed route information into a reference coordinate system which is shared or commonly known between plural devices. For example, a reference coordinate system may be commonly used between two communicatively coupled devices, such as wireless communication devices between which geographic route information is being communicated. A shared reference coordinate system may be implicitly or explicitly pre-specified, or alternatively may be specified via prior, concurrent, or subsequent communication between wireless communication devices, or as part of the processed route information. A default shared reference coordinate system, and possibly one or more alternate reference coordinate systems may be pre-specified and used by plural devices. A reference coordinate system may be specified by communicating its index in a predetermined shared list of reference coordinate systems.

The availability of a shared reference coordinate system enables processed route information to be communicated without necessarily specifying all aspects of the reference coordinate system context with respect to which the route data is encoded. In addition, use of a shared reference coordinate system which is substantially independent of a particular display map may enable different wireless communication devices to represent the geographic route in different ways, for example with respect to, or overlaid upon, different reference maps or different representations of same or different reference maps.

Data processing 140 such as coordinate conversion may be performed on the processed route information following receipt by a receiving device, as illustrated in FIG. 1B. Processing 140 may comprise processing the received processed route information to provide route output indicative of the geographic route relative to a reference coordinate system. For example, the reference coordinate system may be a shared reference coordinate system also used by the transmitting wireless communication device, or a reference coordinate system associated with a desired output reference map. Processing 140 may include conversion of processed route information between one or more coordinate systems, via one or more processing operations.

In some embodiments, processing 140 may comprise processing the processed route information to provide route output data indicative of the geographic route relative to an output reference map. This may comprise converting the processed route information between reference coordinate systems as appropriate. The output reference map may be loaded from memory of the receiving device, retrieved from a server, received from the transmitting device or otherwise obtained.

Processing of the processed route information at the receiving device may comprise one or more operations analogous or even inverse to those at the transmitting device. For example, coordinate conversions via application of linear or nonlinear transformations, conversions between data formats, and the like, may be performed by the receiving device similarly to those performed by the transmitting device. In some embodiments, processing at the receiving device comprises converting processed route information, encoded with respect to one reference coordinate system, to generate route information or route output encoded with respect to another coordinate system, such as a reference coordinate system associated with an output reference map. In some embodiments, processing at the receiving device comprises converting processed route information to generate route information or route output encoded with respect to a coordinate system associated with an output user interface.

Communication

Communication of the processed route information from a transmitting wireless communication device may comprise forming a message for delivery via a wireless communication network to a recipient such as another wireless communication device, said message containing at least a portion of said processed route information. For example, the message may be formed and addressed to a recipient using one or more addressing schemes. Communication may also comprise sending the message over a wireless communication network such as a peer-to-peer, structured, cellular, ad-hoc or other type of network.

The communication operation 130 illustrated in FIG. 1A comprises forming 132 and sending 134 of a message comprising processed route information from the wireless communication device receiving the route input. The message is delivered via a wireless communication network, and may be appropriately addressed to one or more intended recipient devices, such as another wireless communication device, data storage device, home computer, or the like. The communication operation 135 illustrated in FIG. 1B comprises receipt of the message comprising processed route information. Wireless transmission of data from the wireless communication device may be performed directly between devices or via a network, using various methods and protocols, as would readily be understood by a worker skilled in the art. The message may be addressed so that it reaches the intended one or more recipients by direct communication or appropriate forwarding of the message through a network. The network may be a data network linked to or associated with a wireless service provider, for example.

Communication of the processed route information may comprise further processing, such as scheduling, addressing, packetizing, channel or source encoding, modulation, decoding, demodulation, error correction, retransmission operations, and the like. Communication may comprise transmission, relaying, and reception operations in accordance with one or more communication protocols such as physical layer, link layer, medium access control (MAC) sublayer, network layer, transport layer, session layer, presentation or application layer protocols, as specified by the Open Systems Interconnection (OSI) model, or like protocols. It is understood that communication may relate to transference of processed route information between two devices, such that a substantially accurate copy of the processed route information, or of information substantially accurately indicative of the geographic route, is received by a receiving device such as a wireless communication device.

Communication of processed route information may comprise direct or peer-to-peer communication between devices, communication through a cellular network or other structured or ad-hoc wireless network, communication through a combination of networks and network servers, or the like. In some embodiments, processed route information may pass through a server which may provide further processing of the processed route information, or which may analyze and respond to processed route information in a predetermined manner, for example by appending an appropriate map or communicating availability of one or more appropriate maps to a receiver. An appropriate map may be indicated by the wireless communication device transmitting the processed route information.

In some embodiments, communication of processed route information may be point-to-point or point-to-multipoint. In some embodiments, processed route information may be addressed to one or more recipients and provided to a server. The server may then replicate and retransmit the processed route information toward the addressed recipients as needed.

Communication of processed route information may be performed in accordance with one or more proprietary or non-proprietary protocols, such as Short Message Service (SMS), Multimedia Messaging Service (MMS), email, File Transfer Protocol (FTP), Message Session Relay Protocol (MSRP), SIP Message Method request, XMP/Jabber, Unstructured Supplementary Service Data (USSD) protocol, Using Presence mechanisms such as contained in a presence document delivered in a SIP NOTIFY Method request or SIP PUBLISH Method request or the like. Communication may involve one or more connectionless or connection-oriented protocols. For communication purposes, processed route information may be represented in a format appropriate to the communication protocols in use. For example, processed route information may be represented in text or ASCII format, binary, octal or hexadecimal format, XML including the GEO location protocol formats defined by bodies such as IETF or OMA, or other formats, in accordance with predetermined procedures for encoding and decoding processed route information in the appropriate format, as would readily be understood by a worker skilled in the art. Processed route information may be communicated as compressed data, encrypted data, or a combination thereof.

In some embodiments, a reference map, or information indicative of one or more appropriate reference maps, associated with the geographic route may be transmitted, for example prior to, during, as part of, or following transmission of the processed route information. The reference map or information indicative thereof may be transmitted by the wireless communication device sending the processed route information, by an intermediate server forwarding the processed route information, or by another server responding to a request by a sender or receiver of the processed route information. An index number, range of index numbers, or other indication may be provided to facilitate retrieval of an appropriate reference map with respect to which the geographic route may be represented. In one embodiment, given such information and a predetermined collection of maps, an appropriate map may be unambiguously selected.

In some embodiments, receiving devices of the present technology may substantially autonomously select maps for example based on processed route information. In this case, an indication of an appropriate reference map may not be required. Rather, the receiver may use coordinates of the geographic route, with respect to a predetermined reference coordinate system, to determine an appropriate geographic area and associated output reference map.

In some embodiments, processed route information indicative of a geographic route may be transmitted during a communication session, for example in real time. For example, route information may be transmitted concurrently with a conversation such as a voice or text conversation, for example via use of concurrent physical or logical channels. In one embodiment, a complete geographic route may be displayed via a receiver once it is completed and transmitted. In another embodiment, a geographic route may be displayed as it is being input, thereby illustrating a progression in time of portions of the geographic route as they are input.

In some embodiments, processed route information may comprise a time component for time-varying presentation of the geographic route. For example, the process of inputting the geographic route as route input may be recorded and played back at the receiving device. As another example, the route, reference map, or both, may be animated to represent travel time, sequences of locations or activities along the route, or the like.

In some embodiments, route-related information may be provided with the processed route information, which is associated with the geographic route. For example, text indicating points of interest, pictures of points of interest along the route, recorded voice commentary, hyperlinks, animated videos, or other multimedia may be associated with the geographic route and accessible for viewing at the receiving device, for example interactively. The processed route information may include interactive links, displayed in association with the geographic route, which a user may access to view the route-related information. As another example, travel times, travel distances, or other travel information may be displayed along with the route. This information may further be updated based on location along the route, for example determined via GPS, or other suitable location identification system or module. In some embodiments, processed route information may include time stamps or route waypoints.

In some embodiments, route-related information may be captured at one device and incorporated into the processed route information, or message containing same, to be communicated to one or more other devices. Route-related information may be associated with a map reference. For example, a picture, video, voice note, text note, or the like may be associated with a geographic location, zoom level, rotation, one or more layers, or a combination thereof.

In some embodiments, options may be provided for viewing or communicating additional information. For example, route-related information may be stored on a transmitting wireless communication device, server, or the like, and provided only upon request by a receiving device. Requests may be generated automatically via interactive links displayed in association with the geographic route.

In some embodiments, the amount of processed route information communicated may be variable. For example, an initial communication of processed route information may comprise information indicative of the geographic route at a predetermined resolution. The technology may provide for requesting and responding additional processed route information, for example a higher resolution representation of the geographic route, or additional information of one or more types. Requests, responses, or both, may be generated automatically or in response to user interaction.

In some embodiments, determination or negotiation of relevant capabilities of the wireless devices may take place between the two wireless devices prior to exchanging route information. Such capabilities that may be exchanged include screen size and resolution, available maps, image formats and location software and software versions, and supported location identification modules and supported geographical location and civic location coordinate reference formats. The determination of the capabilities of the receiving device may be used by the transmitting device when generating the processed route information prior to transmission.

Presenting Route Output

In some embodiments, an output reference map may be represented on an output user interface, such as a visual display, along with a representation of the geographic route in accordance with the route output data in step 150. For example, a representation of the geographic route may be overlaid on the output reference map. In some embodiments, a user interface may be operable to adjust the on-screen representation of output reference map and associated geographic route, for example, interactively. The geographic route is displayed in context of the output reference map. For example, if the representation of the output reference map is changed, for example by panning, tilting, zooming, or the like, the representation of the geographic route associated with the route output data may be modified accordingly, such that a substantially accurate representation of the geographic route is maintained.

In some embodiments, the route output data may be processed to provide text or voice-based turn-by-turn instructions, or other location-based services. Such services may be provided in addition to or instead of visual representations of the geographic route. Location-based services may provide output data representative of the geographic route which is presented in response to movement of a wireless communication device presenting the route output.

In some embodiments, the geographic route may be processed using auto-navigation capabilities, for example to provide a modified geographic route representative of a combination of a user-defined route and an automatically generated route.

In some embodiments, plural geographic routes may be communicated and subsequently processed together. For example, plural geographic routes may be transmitted to different receivers, or received by a receiver. Processing may be performed, for example to extract common features of plural routes, or to compare or analyze plural routes.

Computer Program Product

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one wireless communication device, and a second portion of the method may be performed using another wireless communication device, server, or the like. In this case, each computer program product is a computer-readable medium upon which software code is recorded to execute appropriate portions of the method when a computer program product is loaded into memory and executed on the microprocessor of a wireless communication device.

Wireless Communication Device

The method described herein can be implemented on a wireless communication device having appropriate communication capabilities, such as voice communication capabilities, data communication capabilities, or a combination thereof. The term "wireless communication device", for the purposes of this specification, shall include any wireless handheld, smart phone, PDA, tablet, laptop, netbook, or other communication device that is capable of transmission and reception of data via a wireless communication medium such as radio.

Figure 2:
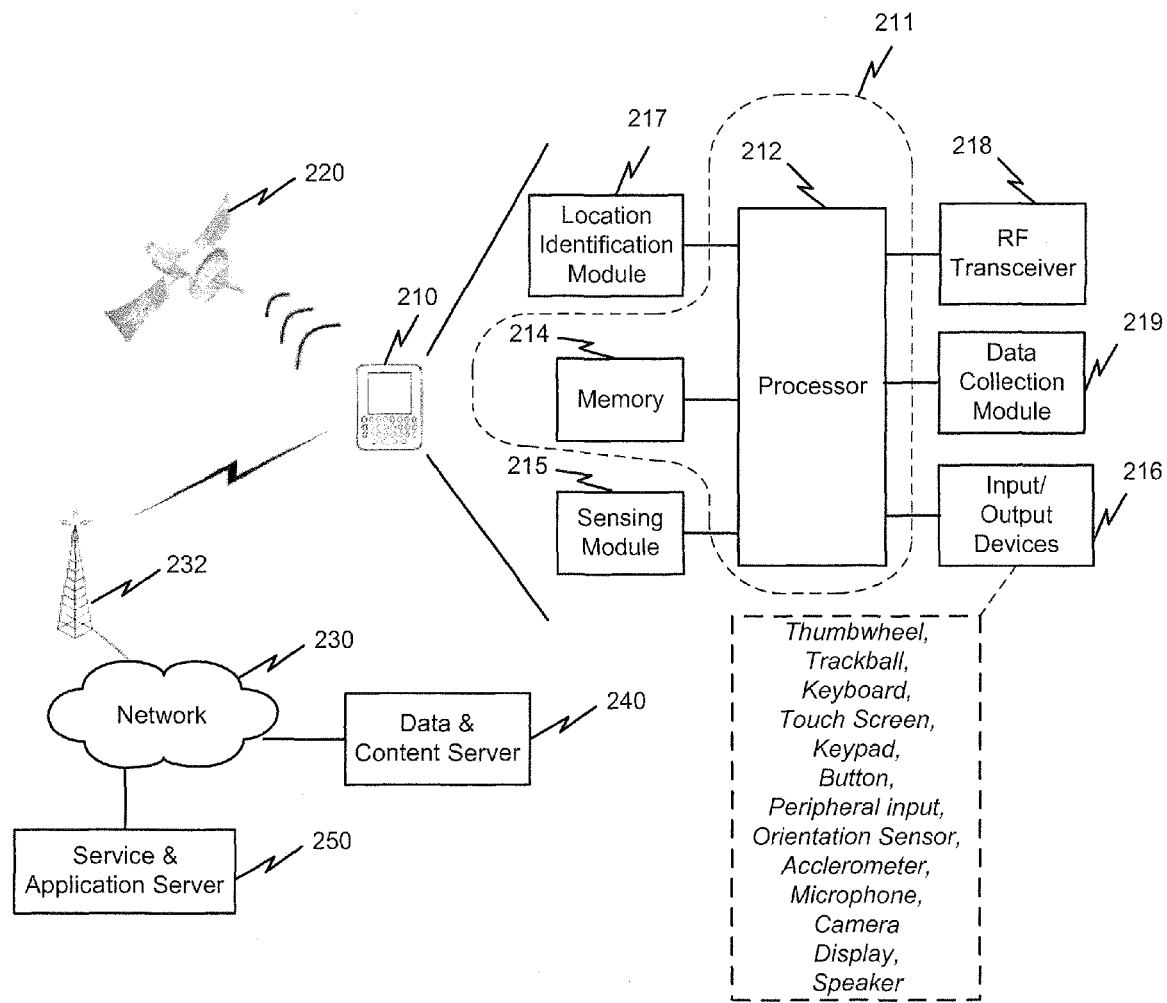
FIG. 2 illustrates a block diagram of an exemplary wireless communication device.

FIG. 2 illustrates a block diagram depicting certain main components of an exemplary wireless communication device 210. It should be understood that FIG. 2 is intentionally simplified to show only certain components; the device 210 may include other components beyond those shown in FIG. 2. The device 210 includes a processing module which may comprise a microprocessor 212 (or simply a "processor") which interacts with memory 214 (in the form of RAM, flash memory or the like, or combinations thereof) to enable a variety of device functions and to execute an operating system for running software applications loaded on the device. In embodiments, the processing module may have in-built memory capabilities. The device 210 includes a radiofrequency (RF) transceiver 218 for communicating wirelessly with a base station 232 of a wireless network 230.

The RF transceiver 218 may optionally be alternatively or additionally used for communicating directly with another peer device such as a third party wireless communication device, for example as may occur in some ad-hoc networks. The base station 232 may be a cellular base station, wireless access point, or the like. The base station 232 may change as the wireless communication device travels. The RF transceiver 218 includes a wireless communication channel for transmitting and receiving data. The RF transceiver 218 may further allow for a wireless voice channel for transmitting and receiving voice communications, for example concurrently with transmission and reception of data over the same or a separate logical or physical channel.

Processor, memory, and other associated components such as software program elements, may be associated herein with functional processing modules, which are configured to perform one or more specified computing or processing tasks. A processing module may refer to a configuration of hardware, software, firmware, or a combination thereof for completing its specified tasks, and may coexist concurrently or sequentially with other processing modules associated with the same or different hardware, software, or firmware.

In some embodiments, the device 210 further comprises a location identification module 217, which is configured to determine the location of the wireless communication device. In some embodiments, the location identification module is a GPS receiver chipset for receiving GPS radio signals transmitted from the one or more orbiting GPS satellites 220. The GPS receiver chipset can be embedded within the device or externally connected, such as, for example, a Bluetooth™ GPS puck or dongle. Other systems for determining location may be used in place of GPS, as would be readily understood by a worker skilled in the art.

In terms of input/output devices or user interfaces (UI's) 216, the device 210 may include one or more of the following: a display (e.g. a small LCD screen), a thumbwheel and/or trackball, a keyboard; a touch screen, a keypad, a button, a USB or serial port for connecting to peripheral equipment, an orientation sensor, an accelerometer, a speaker, a microphone, a still camera and a video camera. The display may optionally have touch-screen functionality.

The wireless communication device 210 sends and receives communication signals via the RF transceiver 218. When communicating wirelessly with a base station 232 of a wireless network 230, the device 210 may communicate in accordance with one or more appropriate technologies such as: Global Systems for Mobile communications (GSM), General Packet Radio Service (GPRS), Code Division Multiple Access (CDMA) technologies, Wideband CDMA (WCDMA), whether 2G, 3G, High speed packet access (HSPA), Universal Mobile Telecommunication System (UMTS) based technologies, Long Term Evolution (LTE)

technologies, Orthogonal Frequency Division Multiplexing (OFDM) technologies, Ultra-Wideband (UWB) technologies, Wi-Fi™ or WiMAX™ technologies, or other communication technologies and protocols as would readily be understood by a worker skilled in the art. In some embodiments, the wireless communication device 210 may be capable of operation using multiple protocols.

The base station 232 may be part of a wireless network, such as a cellular network, local-area network, wide-area network, wireless hotspot network, or the like. The wireless communication device, base station, network components, and the like, may be configured for data communication, voice communication, or a combination thereof, possibly using additional components, configurations and procedures where appropriate, such as SIM cards, authorization and authentication procedures, handoff procedures, and the like, as would be readily understood by a worker skilled in the art.

Aspects of the present technology relate to a wireless communication device or system of wireless communication devices configured to generate and communicate geographic routes to a receiving device. The wireless communication device comprises an output device or user interface such as a visual display for presenting a reference map. The wireless communication device further comprises an input user interface such as a touch screen, trackball, stylus pen or keypad configured to receive route input indicative of a geographic route, relative to the reference map.

The wireless communication further comprises one or more processors and one or more memories configured at least in part to provide a processing module configured to process the route input with respect to a reference coordinate system, to generate processed route information indicative of the geographic route.

The wireless communication device further comprises a radiofrequency transceiver configured to transmit the processed route information to a receiving device. The receiving device may be another wireless communication device, similarly or differently configured from the wireless communication device transmitting the processed route information. Communication via the radiofrequency transceiver may comprise use of one or more proprietary or non-proprietary wireless communication technologies, such as mentioned herein.

Embodiments of the present technology further provide for a receiving device, such as a wireless communication device configured to receive, process and display processed route information so as to represent the geographic route with respect to an output reference map. The output reference map may be the same as or different from the reference map. The receiving device may also be configured to transmit processed route information, as described herein. With respect to the receiving device, the radiofrequency transceiver may be configured to receive processed route information indicative of a transmitted geographic route.

The receiving device may comprise a processing module configured to process the processed route information received from a transmitting device. Such processing may be performed at least in part based on the reference coordinate system and an output reference map to generate a route output indicative of a geographic route relative to the output reference map, the output user interface further configured to present the route output relative to the output reference map.

EXAMPLES

Figure 3A:
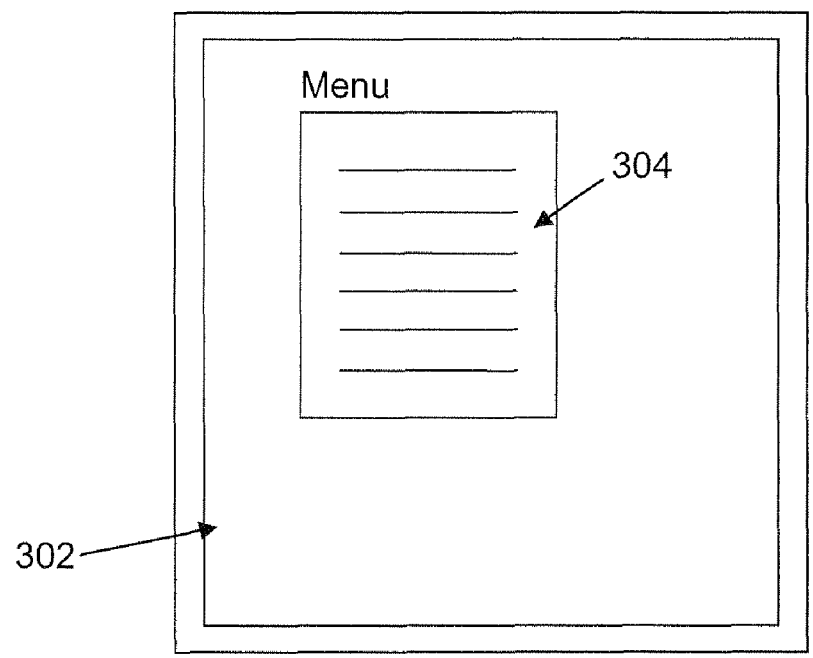
FIG. 3A illustrates a user output interface of a device displaying a menu for accessing functionality in accordance with embodiments of the present technology.
Figure 3B:
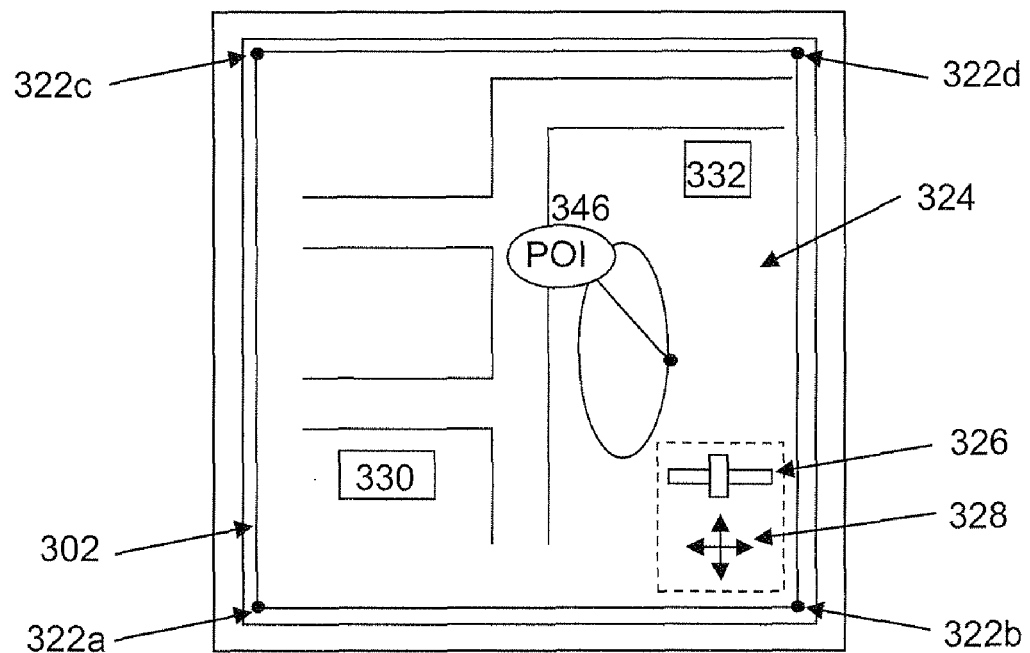
FIG. 3B illustrates a user output interface of a device displaying a reference map in accordance with embodiments of the present technology.
Figure 3C:
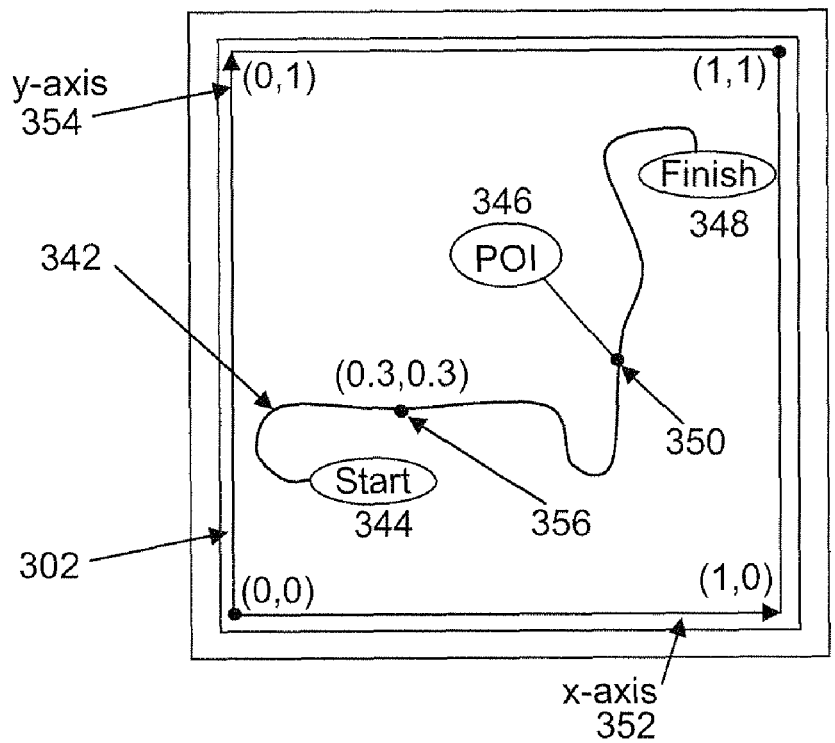
FIG. 3C illustrates a graphical representation of route input in accordance with embodiments of the present technology.
Figure 3D:
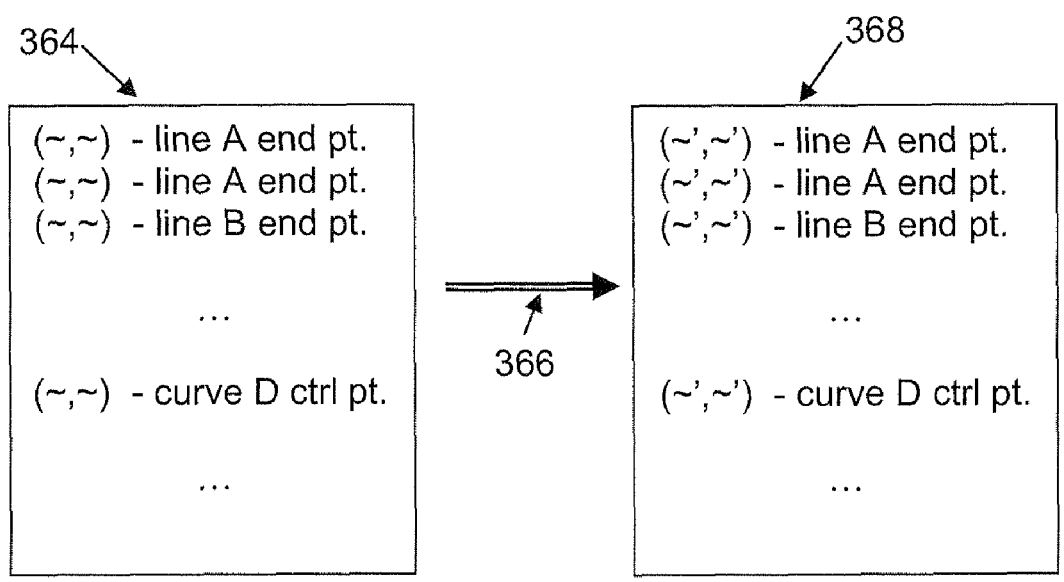
FIG. 3D schematically illustrates processing a portion of route input to provide processed route information in accordance with embodiments of the present technology.
Figure 3E:
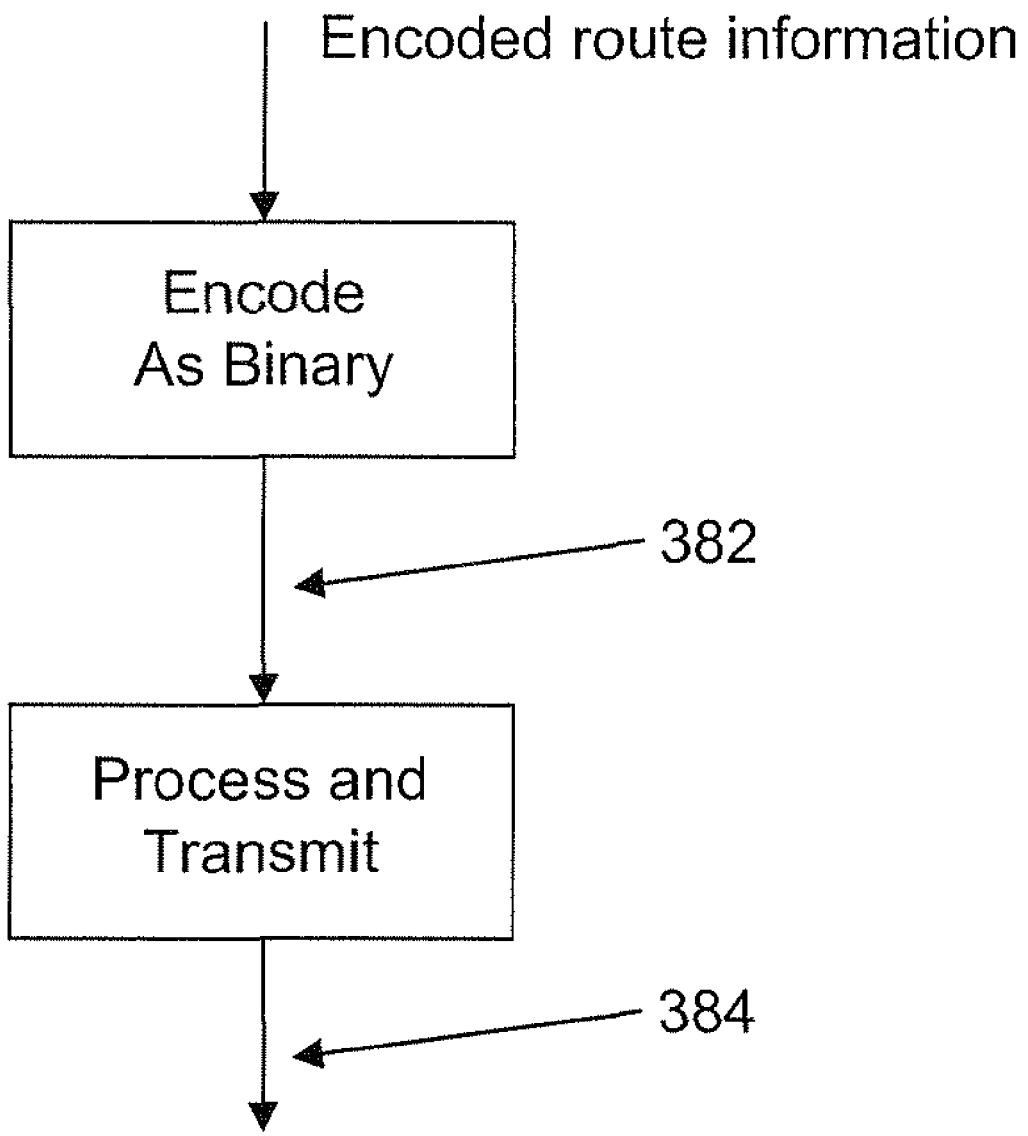
FIG. 3E schematically illustrates acts related to communication of processed route information in accordance with embodiments of the present technology.
Figure 4:
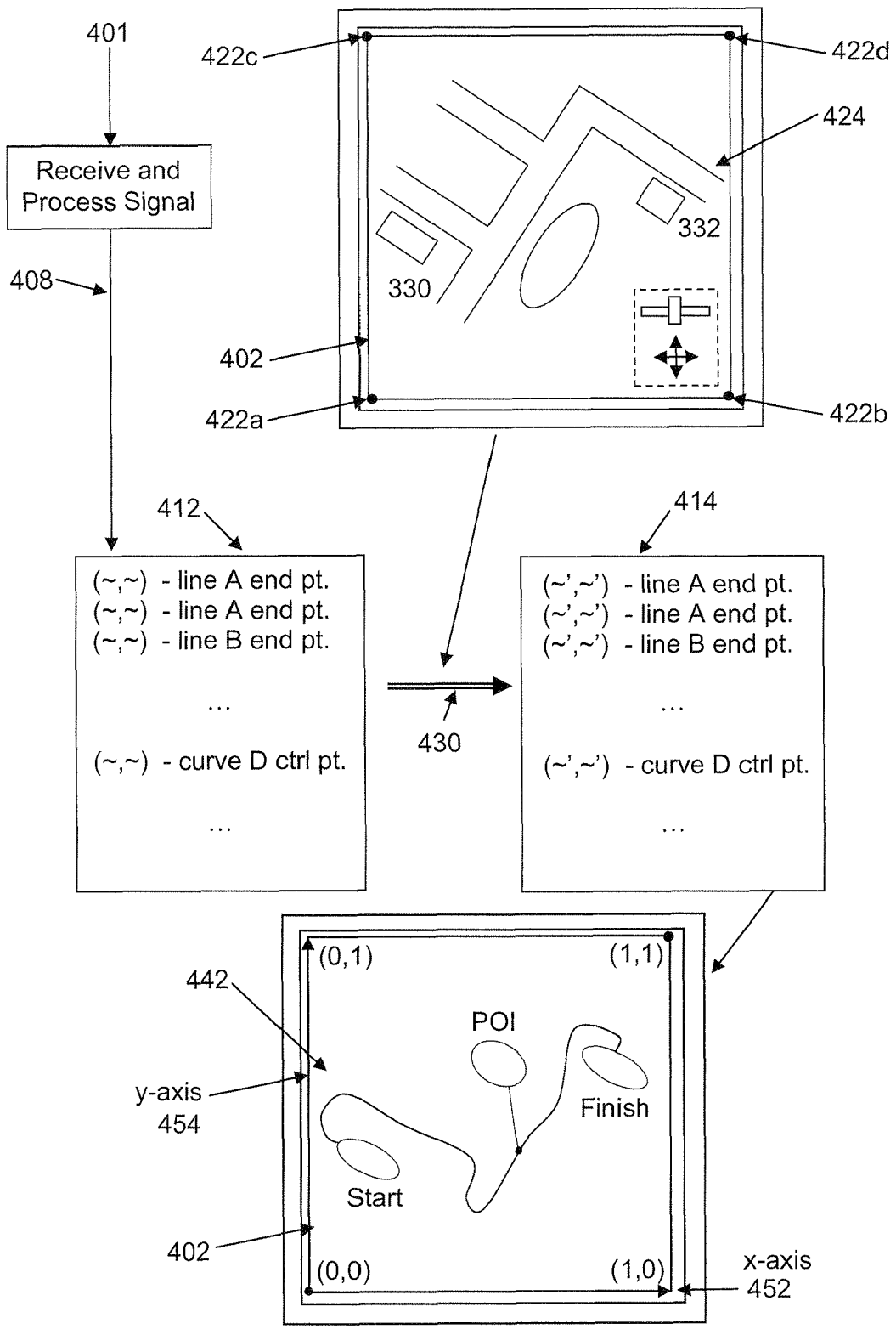
FIG. 4 illustrates aspects related to receiving, processing and presenting processed route information by a receiving device, in accordance with embodiments of the present technology.

Implementations of the present technology will now be further explained with regard to the example scenarios presented in FIG. 3 and FIG. 4. It should be expressly understood that these scenarios are only examples that are provided solely for the purposes of illustrating how the technology works in certain circumstances. Accordingly, these examples should not be construed as limiting any of the aspects of the technology already described above and claimed in the appended claims.

Consider first the example scenario depicted schematically in FIG. 3A to FIG. 3E. A visual display 302 is provided as an output user interface of a wireless communication device configured for generating and communicating a geographic route. An interactive menu 304, as illustrated in the schematic screen representation of FIG. 3A, may be accessed to launch an appropriate application executed by the wireless communication device. The menu 304, or subsequent menus of the application may further be used to select a desired map for representation via the visual display 302 and an associated input user interface such as a trackball, keypad, touch screen, stylus pen, or the like. Alternatively, a voice or keypad actuated menu may be provided.

A selected map may be represented on the visual display 302, as illustrated in FIG. 3B. The displayed representation 324 of the selected map may be adjusted by user input. For example, on-screen zoom control 326 and pan control 328 may be manipulated by the user input interface to adjust the displayed map representation 324. Other controls, such as tilt, rotate, layer or customization controls, may also be provided as on-screen controls, drop-down menu controls, controls responsive to predetermined input actions, or the like. As shown, the displayed map representation 324 depicts a rectangular geographic area between four corner coordinates 322a, 322b, 322c and 322d. The illustrated representation includes an area of interest and locations of interest, such as a hotel 330, a restaurant 332, and an intermediate point of interest 346.

The present technology may be used to generate a geographic route, for example indicative of a desired route from hotel 330 to restaurant 332. The geographic route may be generated by drawing or tracing a route on the screen 302. Although there may be several desired routes between origin and destination points, the present technology may be used to communicate knowledge of an appropriate route, given context or needs of a user. For example, a route through the park may be more direct, safe, scenic and peaceful to traverse on foot or by bicycle, while a route using roadways or high speed highways may be more appropriate for travel by car. In some embodiments, by allowing route directions to be communicated from user to user, parameters for providing an appropriate route may be naturally communicated between users, instead of or in addition to an automated route generation program.

In the present example scenario of FIG. 3, route input indicative of a geographic route from hotel 330 to restaurant 332 is received and represented on the visual display 302 as route representation 342, as illustrated in FIG. 3C. The route input may be provided initially via a series of signals from an input user interface, and may be subsequently processed and represented as a series of instructions held in memory for graphically representing the route input.

In the present example scenario, the route input data may be represented as instructions for displaying the route representation 342 on the visual display 302. The instructions may provide for an indication of starting point 344, intermediate point of interest 346, and finishing point 348. An interactive link 350 may be included with the route representation, which may be accessed to show a picture, sound file, or other media associated with the point of interest 346.

When represented as display instructions, the route input data may comprise an indication, such as a list, of points to be displayed, control points indicative of lines or curves to be displayed, or the like, or a combination thereof. Point locations may be represented as orthogonal (x,y) coordinates relative to predetermined axes. For example, x-axis 352 and y-axis 354 illustrated in FIG. 3C may be used as reference axes, each screen location here represented for illustration purposes as an ordered pair of numbers between (0,0) and (1,1), although other numerical systems may be used, such as pixel indexes. For example, point 356 on the route representation, being about three tenths of the way along both the x-axis 352 and y-axis 354, may be represented by x,y coordinates (0.3,0.3). For a raster-encoded route representation, points along the route representation, to a predetermined density, may be represented in this manner, and interpolation between points may be performed if necessary. For a vector-encoded route representation, control points may be so represented, along with indications of how the control points are to be used.

In some embodiments, route input may comprise edited processed route information received from a network or another device. For example, route input may comprise previously received processed route information, transformed by instructions for moving point of interest 346 from one location to another. Editing of a displayed route representation may be performed via a user input interface on a wireless communication device. Processed route information may be passed between wireless communication devices, each of which may edit, modify or augment the processed route information via an input operation before processing and communicating the updated and further processed route information to one or more other wireless communication devices.

FIG. 3D illustrates an example list of control points 364 forming part of the route input data encoded in a vector format. Each control point is indicative of a location on the visual display 302, relative to the x-axis 352 and y-axis 354, along with an indication of how the control point is to be interpreted for representing the geographic route. For example, the first two control points of the list 364 are representative of endpoints of a line.

FIG. 3D further illustrates a processing operation applied to a list of control points 364, representing part of the route input. In the present example, the processing operation is performed to provide processed route information, comprising a list of control points 368 in vector format, with respect to a reference coordinate system other than the x,y coordinate system associated with the visual display 302. For example, each control point in the list 368, may correspond to a control point in the list 364, encoded with respect to a latitude and longitude reference coordinate system such as WGS 84.

In the present example, the processing operation includes performing a transformation 366 between coordinate systems. For example, given the scale of the displayed reference map, a linear transformation may be used while maintaining a sufficiently high degree of accuracy. As an example, suppose that the y-axis 354 direction illustrated in FIG. 3C corresponds to North, that the displayed map representation 324 is a plan or bird's eye view, and that the corner coordinates illustrated in FIG. 3B correspond to longitude and latitude coordinates as follows: 322a corresponds to longitude 123.114713 degrees West and latitude 49.263215 degrees North; 322b corresponds to longitude 123.108381 degrees West and latitude 49.263215 degrees North; 322c corresponds to longitude 123.114713 degrees West and latitude 49.265695 degrees North; and 322d corresponds to longitude 123.108381 degrees West and latitude 49.265695 degrees North. (These coordinates are exemplary only, and may not coincide with a real-world geographic area as illustrated.) Then the transformation 366 may be substantially represented, to a predetermined degree of accuracy, by linear equation $[z;w]=A[x;y]+b$, where x and y are coordinates with respect to x-axis and y-axis in list 364, z and w are longitude and latitude coordinates in list 366, b=[123.114713; 49.263215], and A=[−0.006332, 0; 0.00248, 0].

FIG. 3E generally illustrates operations associated with transmission of the processed route information, here comprising list 368. The list 368 may be encoded as a binary sequence or file 382. The binary sequence or file 382 may then be processed and transmitted to produce an electromagnetic signal 384 or series of signals representing communication of the binary sequence or file 382. Processing and transmission may comprise operations such as packetization, scheduling, source and channel coding, modulation, or a combination thereof. Details of wireless data communication as used herein would be readily understood by a worker skilled in the art.

The processed route information may contain further information, such as an indication of an appropriate reference map relative to which the geographic route may be displayed; representation parameters for displaying the reference map, such as scale, rotation, levels of detail, or the like; or a combination thereof.

FIG. 4 illustrates an example scenario involving reception, processing and presentation of processed route information using a wireless communication device. A signal 401 indicative of processed route information transmitted from another wireless communication device may be received and processed to provide processed route information 408. The processed route information is indicative of a geographic route. In the present example, the processed route information includes a list 412 of control points, which may be interpreted as WGS 84 latitude/longitude coordinates, for example. The processed route information may further include information such as the reference coordinate system with respect to which the control points should be interpreted, associated multimedia objects or links, an indication of one or more appropriate output reference maps to display, or the like.

FIG. 4 further illustrates a representation 424 of an output reference map, displayed via a visual display 402, with respect to which the geographic route may be represented. The output reference map representation 424 may be manually selected and configured, automatically selected and configured, or selected and configured in accordance with a combination of manual and automatic operations. The reference map may be selected and configured based on processed route information, such as an indication of a reference map to display and representation parameters for configuring an on-screen representation of the reference map. Selection and configuration may be based at least in part on information contained in or associated with the processed route information. As shown, the displayed map representation 424 depicts a rectangular geographic area between four corner coordinates 422a, 422b, 422c and 422d. Here, 422a corresponds to longitude 123.111547 degrees West and latitude 49.262395 degrees North; 422b corresponds to longitude 123.106798 degrees West and latitude 49.264255 degrees North; 422c corresponds to longitude 123.116296 degrees West and latitude 49.264255 degrees North; and 422d corresponds to longitude 123.111547 degrees West and latitude 49.266115 degrees North. As illustrated, the displayed reference map representation 424 is a rotated and scaled version of reference map representation 324 of FIG. 3. In another embodiment, the displayed map representation 424 is substantially the same as the displayed map representation 324.

The received processed route information may be processed as follows. Based on the list 412 and the corner coordinates 422a to 422d of the output reference map representation 424, a transformation 430 may be defined for transforming control point coordinates in the list 412, encoded with respect to a WGS 84 system, to control point coordinates in the list 414, encoded with respect to an x,y coordinate system associated with the visual display 402. The x,y coordinate system comprises x-axis 452 and y-axis 454 used similarly to the x,y coordinate system of FIG. 3C. To a predetermined degree of accuracy, the transformation 430 may be represented by linear equation $[x;y]=C[z;w]+d$, where x and y are coordinates, with respect to x-axis 452 and y-axis 454, of control points represented in list 414, z and w are longitude and latitude coordinates of control points represented in list 412, $d=[-280.7403; -26204.4183]$, and $C=[-105.2853, 268.8172; 105.2853, 268.8172]$. The above linear equation is representative of appropriate rescaling, translation and rotation operations, performed simultaneously or sequentially.

The transformation 430 is representative of at least a portion of processing of the processed route information to generate route output representative of the geographic route with respect to the output reference map 424. The route output may be presented as a visual route representation 442 overlaid over the output reference map 424, displayed on the visual display 402.

Figure 5:
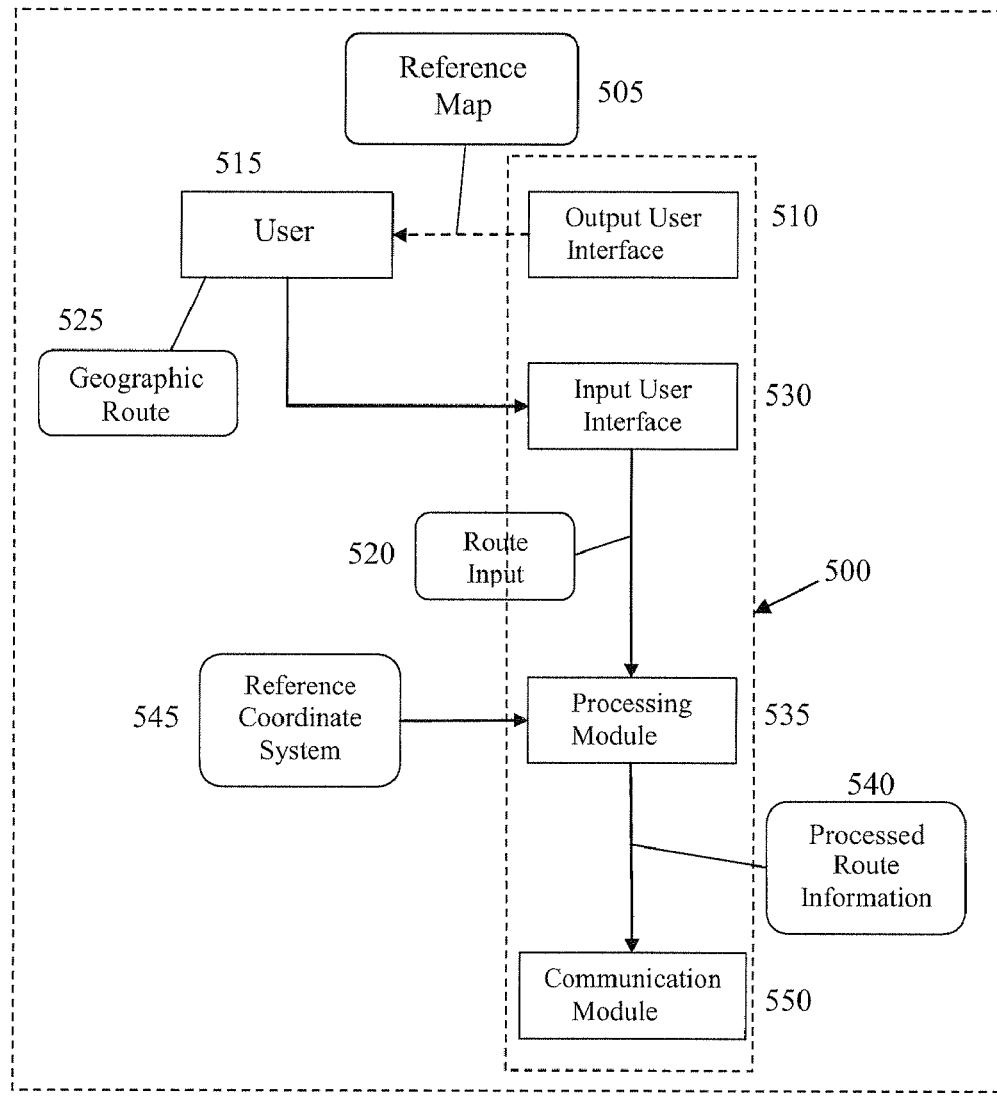
FIG. 5 illustrates aspects of a wireless communication device in accordance with an embodiment of the present technology.

FIG. 5 is a block diagram illustrating operation of a transmitting wireless communication device 500 in accordance with an embodiment of the present technology. The transmitting device is configured to display a reference map 505 via an output user interface 510, to a first user 515 of the device. The user 515 provides route input 520 indicative of a geographic route 525 to the device 500 using an input user interface 530.

The route input 520 is processed using a processing module 535. In the present example, the processing module 535 is configured to generate processed route information 540 based on the route input 520 and a reference coordinate system 545. The processed route information 540 thus generated is indicative of the geographic route 525 with respect to the reference coordinate system 545. The processing module 535 may thus execute a coordinate conversion between route input 520 and processed route information 540. The processed route information 540 is then suitably prepared and wirelessly transmitted by a communication module 550.

Figure 6:
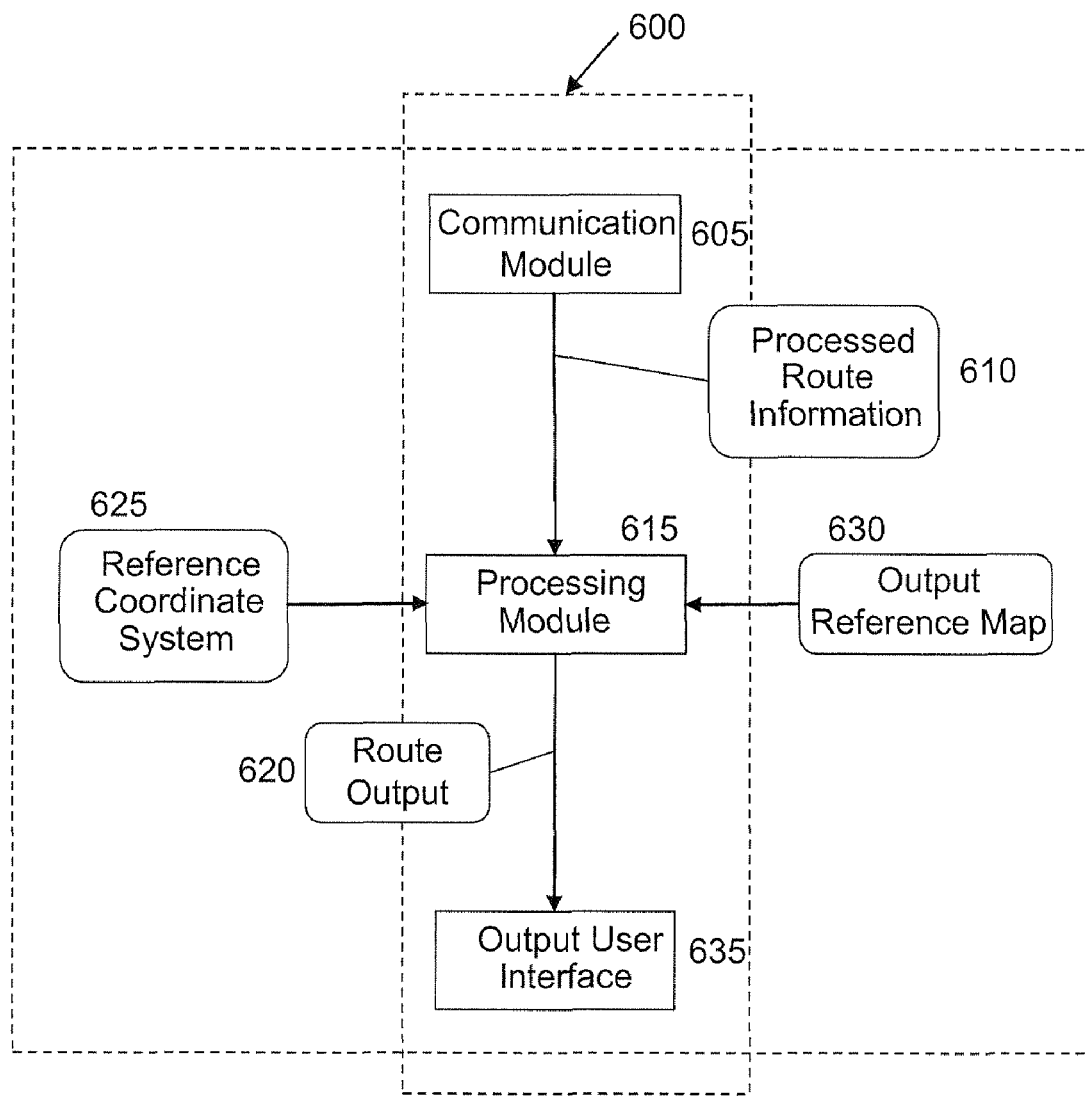
FIG. 6 illustrates aspects of a wireless communication device in accordance with an embodiment of the present technology.

FIG. 6 is a block diagram illustrating operation of a receiving wireless communication device 600 in accordance with an embodiment of the present technology. A communication module 605 is configured to receive a wireless signal and provide processed route information 610 based thereon. The processed route information 610 is indicative of a geographic route with respect to a reference coordinate system, for example as generated by a transmitting wireless communication device as illustrated in FIG. 5. A processing module 615 is configured to receive and process the processed route information 610 to provide route output 620. In the present example, the processing module 615 is configured to generate route output 620 based on the processed route information 610, a reference coordinate system 625, and an output reference map 630. The reference coordinate system 625 is the same as that used at the transmitting device, for example reference coordinate system 545 as illustrated in FIG. 5. The route output 620 thus generated is indicative of the geographic route 525 with respect to the output reference map 630. The processing module 615 may thus execute a coordinate conversion between processed route information 610 and route output 620. The route output 620 is then suitably prepared and presented via an output user interface 635 of the device 600.

Figure 7:
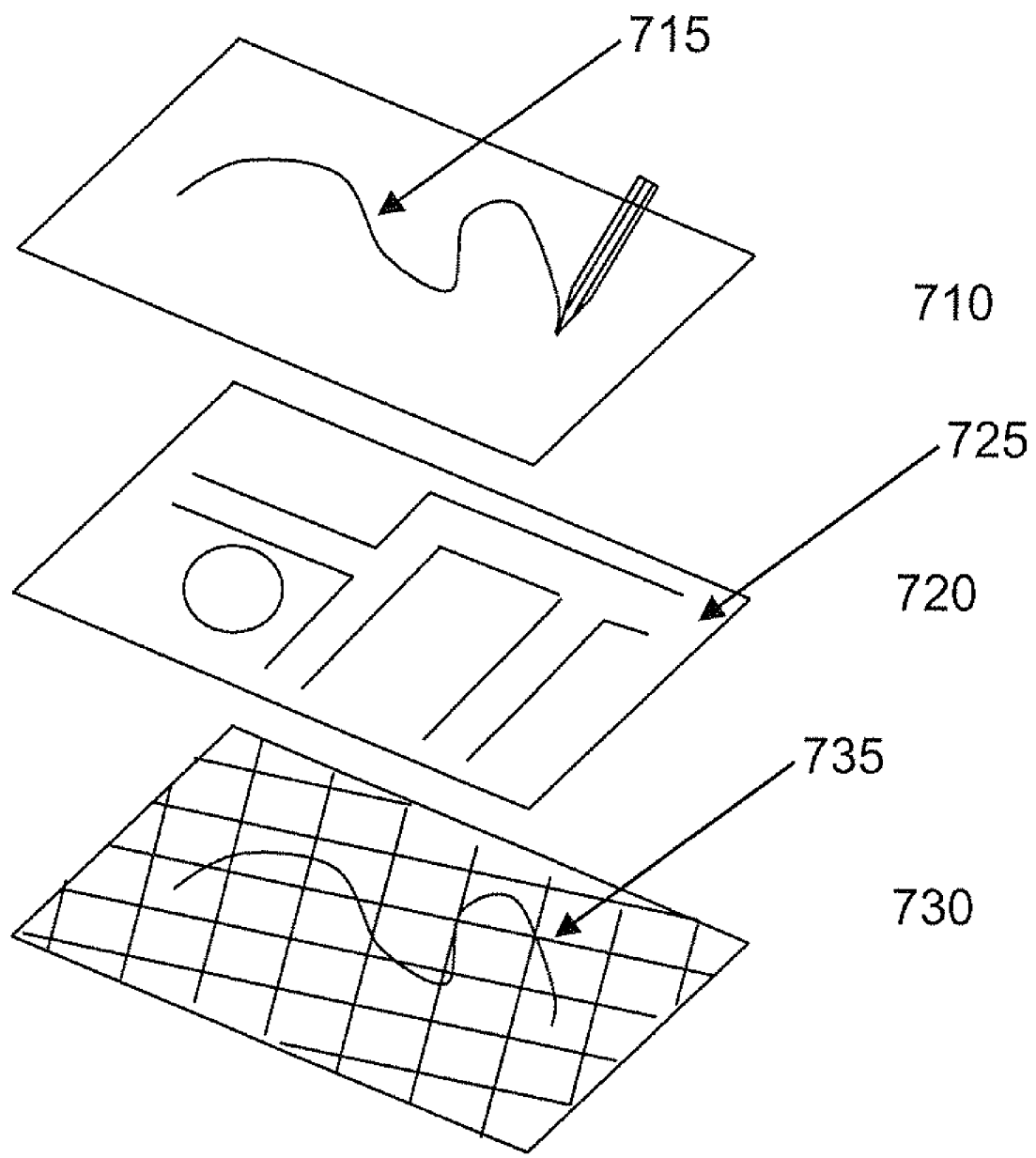
FIG. 7 illustrates a relationship between input user interface, output user interface, and reference coordinate system in accordance with an embodiment of the present technology.

FIG. 7 conceptually illustrates a touch screen input user interface 710, visual display output user interface 720, and reference coordinate system 730 associated with a transmitting device in accordance with an embodiment of the present technology. A route 715 is drawn or traced on the input user interface 710 to provide route input. The route 715 is drawn with respect to a map 725 displayed by the output user interface 720. The route is further processed and encoded to provide processed route information 735 with respect to the reference coordinate system 730.

Figure 8:
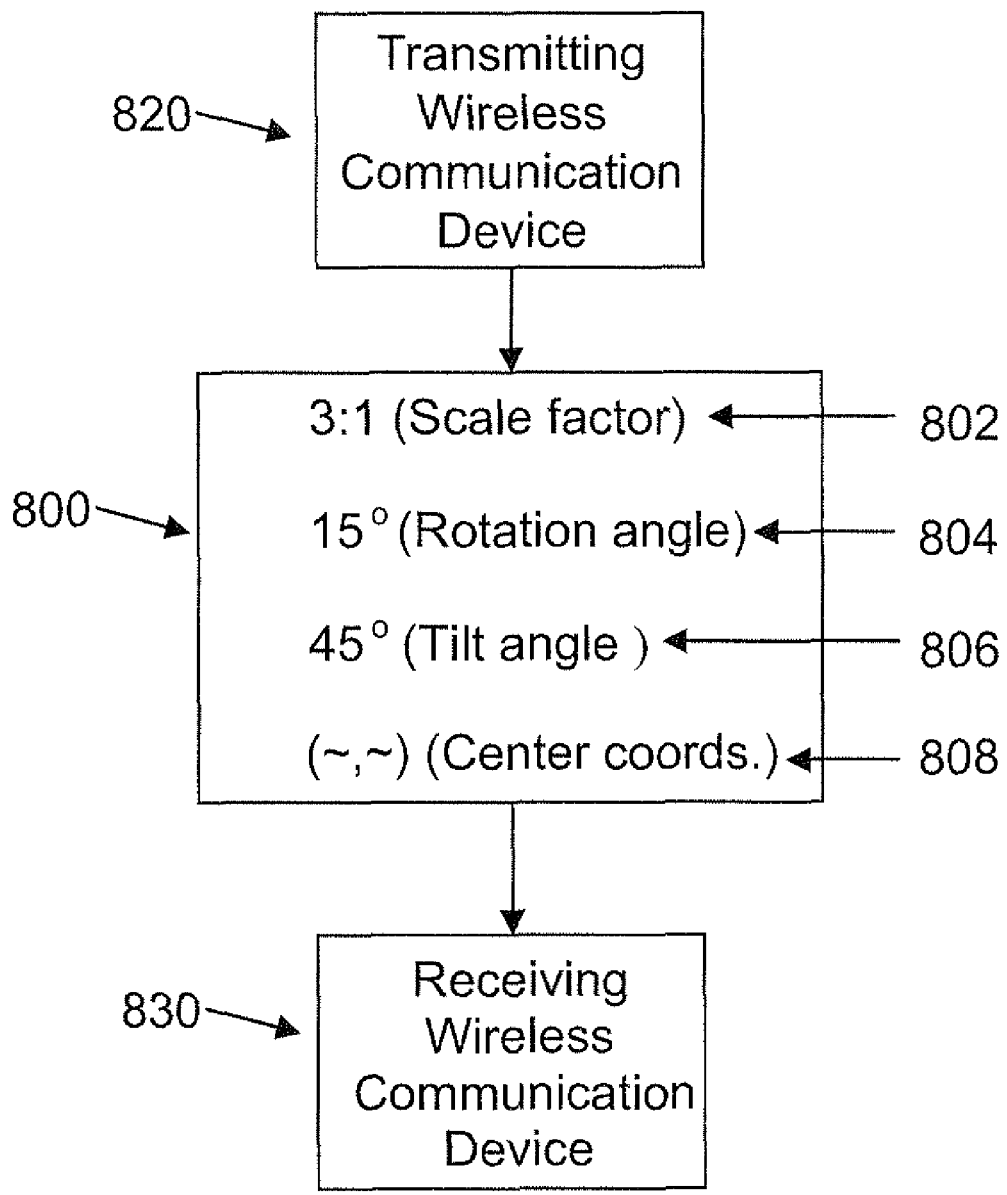
FIG. 8 illustrates communication of additional information from a transmitting device to a receiving device, in accordance with an embodiment of the present technology.

FIG. 8 illustrates, in another exemplary embodiment of the present technology, communication of instructions 800 for configuring or modifying a map representation from a transmitting device 820 to a receiving device 830, or information indicative of parameters related to a desired representation of the output reference map. The instructions 800 are provided to remotely control representation of an output reference map on the receiving device, and may be communicated together with or separately from processed route information. The instructions 800 may include reference map display parameters, such as a zoom or scale factor 802, rotation angle 804, tilt angle 806, and coordinates of the map location 808 to be displayed in the visual display center. Instructions 800 may further include an indication of a desired reference map to display at the receiving device 830.

Providing instructions 800 may facilitate interpretation of received processed route information with respect to a predetermined or indicated reference map. Instructions 800 may also facilitate indicating a desired reference map to be displayed, and a desired display thereof. The instructions 800 may further be updated, for example interactively, in real time, or both. Optionally, the instructions 800 may facilitate displaying a similar reference map and presentation thereof at both transmitting and receiving device. The instructions 800 may also facilitate one or more processing operations, for example by providing information indicative of an appropriate coordinate conversion operation to be performed at the receiving device.

Although in some implementations of the present technology GPS receivers are used to determine the current location of each device, it should be appreciated that other positioning technologies, such as triangulation or trilateration technologies, can be used to determine the current location to a degree of accuracy commensurate with the technique used. For example, cell tower triangulation or radiolocation techniques, as mentioned above, can be used to generate the current location for the device. Alternatively, the identity (and location) of the cell tower handling the device's communications can be used as a proxy for the location of the device. Another approach would be to prompt the user of the device to enter his or her current location (e.g. entering a street address, picking a POI from a map or selecting the current location using crosshairs on a map). As yet another example, Global Navigation Satellite Systems (GNSS) or pseudo-satellite systems other than or in addition to the currently deployed GPS system may be used. For example, GLONASS, Beidou, COMPASS, Galileo, or like systems may be utilized for positioning. Satellite-based, regional, or network-based augmentation or improvement systems such as WAAS and A-GPS may also be utilized to aid in positioning.

This new technology has been described in terms of specific implementations and configurations (and variants thereof) which are intended to be exemplary only. The scope of the exclusive right sought by the applicant is therefore intended to be limited solely by the appended claims.

The invention claimed is:

1. A method for generating and communicating, from a wireless device to a recipient, a geographic route, the method comprising:
presenting a reference map via an output user interface of the wireless communication device, wherein the reference map provides a reference for facilitating input of the geographic route;
receiving, via an input user interface of the wireless communication device, route input indicative of the geographic route relative to the reference map;
processing said route input to generate processed route information indicative of the geographic route with respect to a reference coordinate system, wherein processing said route input comprises converting data indicative of the geographic route with respect to a first coordinate system to data indicative of the geographic route with respect to said reference coordinate system, wherein the first coordinate system is associated with the reference map, and wherein the reference coordinate system is substantially independent of a particular display map; and
forming a message for delivery via a wireless communication network from the wireless communication device to the recipient, said message containing at least a portion of said processed route information.

2. The method as claimed in claim 1, wherein said processed route information comprises route-related information selected from the group comprising: text information, pictures, voice information, hyperlinks, and videos.

3. The method as claimed in claim 1, further comprising:
receiving the processed route information;
processing said processed route information to generate route output indicative of the geographic route relative to an output reference map; and
presenting said route output.

4. The method as claimed in claim 3, wherein the reference coordinate system is common between the reference map and the output reference map, or the reference coordinate system is determined based on a negotiation between the wireless communication devices.

5. The method as claimed in claim 3, wherein processing said processed route information comprises converting data indicative of the geographic route with respect to said reference coordinate system to data indicative of the geographic route with respect to a second coordinate system.

6. The method as claimed in claim 5, wherein said second coordinate system is associated with the output reference map.

7. The method as claimed in claim 1, wherein the route input is generated collaboratively by plural wireless communication devices.

8. The method as claimed in claim 1, further comprising presenting a reference map representation on a visual display of at least one of said wireless communication devices, wherein said reference map representation is configurable at least in part based on local input.

9. The method as claimed in claim 1, further comprising presenting a reference map representation on a visual display of at least one of said wireless communication devices, wherein said reference map representation is remotely configurable.

10. A computer program product configured to generate and communicate, from a wireless communication device to a recipient, a geographic route the computer program product comprising code which, when loaded into a memory and executed on an associated processor, is adapted to perform:
presenting a reference map via an output user interface of the wireless communication device, wherein the reference map provides a reference for facilitating input of the geographic route;
receiving, via an input user interface of the wireless communication device, route input indicative of the geographic route relative to the reference map;
processing said route input to generate processed route information indicative of the geographic route with respect to a reference coordinate system, wherein processing said route input comprises converting data indicative of the geographic route with respect to a first coordinate system to data indicative of the geographic route with respect to said reference coordinate system, wherein the first coordinate system is associated with the reference map, and wherein the reference coordinate system is substantially independent of a particular display map; and
forming a message for delivery via a wireless communication network from the wireless communication device to the recipient, said message containing at least a portion of said processed route information.

11. The computer program product as claimed in claim 10, the code further adapted to perform:
processing said processed route information to generate route output indicative of the geographic route relative to an output reference map; and
presenting said route output.

12. A wireless communication device configured to generate and communicate a geographic route, the wireless communication device comprising:
an output user interface configured to present a reference map, wherein the reference map provides a reference for facilitating input of the geographic route;
an input user interface configured to receive route input indicative of a geographic route relative to the reference map;
a processing module configured to process said route input to generate processed route information indicative of the geographic route with respect to a reference coordinate system, wherein processing said route input comprises converting data indicative of the geographic route with respect to a first coordinate system to data indicative of the geographic route with respect to said reference coordinate system, wherein the first coordinate system is associated with the reference map, and wherein the reference coordinate system is substantially independent of a particular display map; and
a radiofrequency transceiver configured to transmit said processed route information.

13. The wireless communication device as claimed in claim 12, wherein said processed route information comprises route-related information selected from the group comprising: text information, pictures, voice information, hyperlinks, and videos.

14. The wireless communication device as claimed in claim 12, wherein:
the radiofrequency transceiver is further configured to wirelessly receive another processed route information from another wireless communication device, said other processed route information indicative of another geographic route with respect to a defined reference coordinate system;

the processing module further configured to process said other processed route information to generate route output indicative of the other geographic route relative to an output reference map; and the output user interface is further configured to present said route output.

15. The wireless communication device as claimed in claim 14, wherein at least one of the reference map and the output reference map is remotely configurable.

16. The wireless communication device as claimed in claim 12, wherein at least one of the reference map and the output reference map presented on the output user interface is configurable at least in part based on input from the input user interface.

17. The wireless communication device as claimed in claim 12, wherein the processed route information comprises multimedia.

18. The wireless communication device as claimed in claim 12, further configured to transmit processed route information concurrently with a conversation.

* * * * *